Nov. 14, 1967     M. K. OLSON ETAL     3,352,487

VISUAL CHART READER

Filed Nov. 23, 1965

INVENTORS
**MERRILL K. OLSON
OPIE C. TER MEER**

BY *Whittemore, Hulbert & Belknap*

ATTORNEYS

United States Patent Office

3,352,487
Patented Nov. 14, 1967

3,352,487
VISUAL CHART READER
Merrill K. Olson, 1700 S. Williams Ave., Sioux Falls,
S. Dak. 57105, and Opie C. Ter Meer, 990 N. Vista,
Rialto, Calif. 92376
Filed Nov. 23, 1965, Ser. No. 509,372
1 Claim. (Cl. 235—89)

ABSTRACT OF THE DISCLOSURE

An integral transparent sheet having spaced vertical and horizontal opaque areas forming between them transparent columns, and a window at the meeting of the columns for reading computations from a chart composed of vertically and horizontally aligned columns of figures.

---

The present invention relates to a visual chart reader and more particularly to a transparent plastic sheet having angularly related opaque spaced parallel areas forming between them transparent columns arranged in right angular relation. At the intersection of the columns further opaque areas form with the first mentioned opaque areas a transparent box or window through which numerical indicia or the like may be read.

In recent years pay-roll clerks are required to compute withholding deductions from the earned compensation of company employees or refer to prepared printed charts which bear the figures corresponding to the amount to be deducted. These figures vary depending on the number of the employee's exemptions, wages, and other factors and are arranged in vertical and horizontal columns. The present chart is designed to facilitate the determination of the exact amount to be deducted. This may be done quickly by shifting the overlay sheet to align the vertical and horizontal transparent columns with the proper columns on the printed chart, the desired result being readable through the window located at the intersection of the columns.

It is one of the objects of this invention to provide a visual chart reader comprising a transparent light-weight sheet having spaced opaque areas forming between them transparent columns disposed in right angular relation to overlay a printed chart having a multiplicity of computed figures thereon.

It is a further object of the invention to provide a transparent window at the intersection of the columns to permit ready determination of a desired figure.

It is another object of the invention to provide a shiftable rectangular transparent sheet having transparent columns adjacent the sides of the sheet, the sheet being invertible as well as reversible so that the transparent columns may be positioned in any one of a number of positions with respect to the underlying chart.

Figure 1:
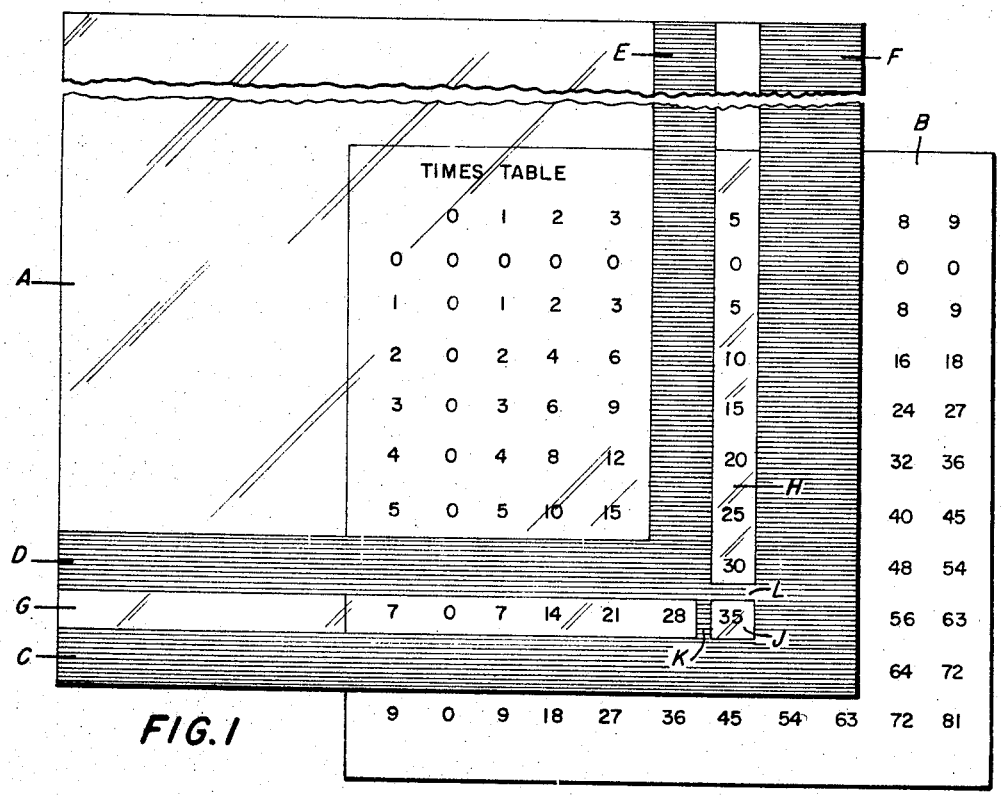
Figure 2:
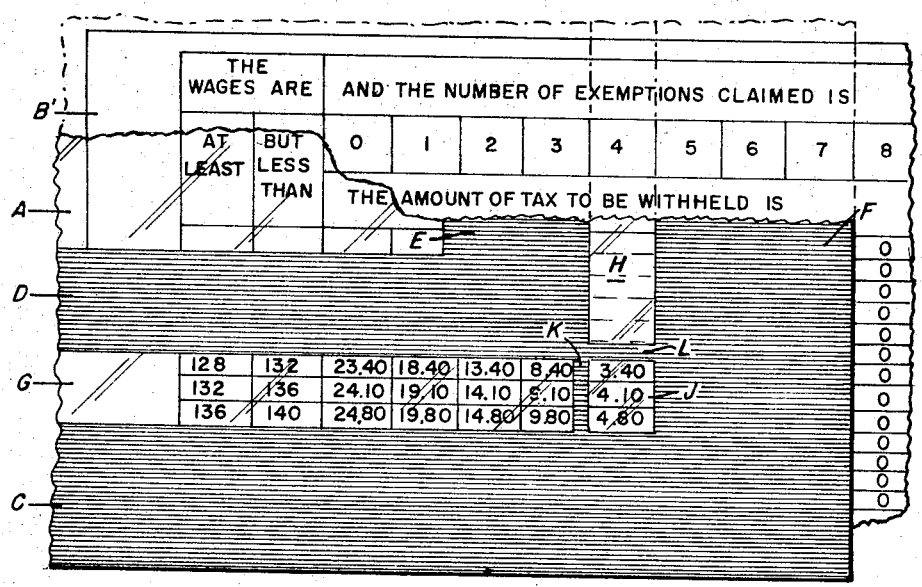

Other objects will be apparent from the following description of a preferred form of the invention, reference being had to the accompanying drawings in which:

FIG. 1 is a top view, partly broken, of the chart reader in overlying relation to a chart bearing the figures of a simple multiplication table; and FIG. 2 is a partial top view of the reader sheet and a chart as is used by pay-roll clerks.

In the drawings, the thin transparent sheet A is illustrated as being rectangular and overlies but is independent of chart B. The sheet may be formed from light-weight plastic or other suitable material. The shaded areas C, D, E, and F represent portions of the sheet that are opaque. It will be noted that areas C and D are parallel to each other and to the lower edge of the sheet, while areas E and F are parallel to each other and to a side of the sheet. Areas C and D are spaced to form between them a horizontal transparent column G. Areas E and F are also spaced from each other providing a vertical transparent column H. At the intersection of the columns G and H a box or window J is formed by narrow opaque stripes K and L extending transversely across the columns and by areas C and F. It will be seen that the edges of these stripes are aligned with those edges of areas D and E adjacent the transparent columns.

It will be obvious that reader sheet A is shiftable over chart B to align the transparent columns G and H with the desired horizontal and vertical column to determine the result of multiplying one number by another. In the drawing the horizontal column is aligned with the numeral 7 and the vertical column with the numeral 5. The result is shown as 35 in the window J.

In FIG. 2 the chart B' is typical of printed data on prepared tables suitable for determining withholding amounts from earned wages. The manner of determining these amounts is similar to that employed in the use of the chart shown in FIG. 1.

While the opaque areas are shown as being adjacent two edges of the reader chart they may be along other edges or spaced from the edges. The opacity may be obtained by either a coating or other methods of coloring the transparent sheet. Since the transparent columns are in right angular relation the reader may be located in other positions than that shown in the drawings.

The reader sheet also protects the chart while in use. It is easily shifted from one position to another and, since only certain portions are opaque, the greater part of the underlying chart is visible while the reader is being manipulated.

What is claimed is:

A visual chart reader for use with a chart having vertical aligned indicia and horizontally aligned indicia comprising a one-piece flat transparent sheet adapted to overlay said chart and to be freely shiftable in any direction with respect to said chart, said sheet having a first pair of spaced parallel opaque areas forming between their opposed edges a vertical transparent column, and a second pair of spaced parallel opaque areas forming between their opposed edges a horizontal column, said first and second columns being in right angular relation and meeting to form a corner and a narrow opaque stripe extending transversely across each of said columns adjacent said corner to form a rectangular window, the sides of said window being aligned with the sides of said vertical and horizontal columns respectively.

References Cited

UNITED STATES PATENTS

| | | | |
|---|---|---|---|
| 1,425,244 | 8/1922 | Easton | 235—89 |
| 1,527,663 | 2/1925 | Beery | 235—89 |
| 1,977,555 | 10/1934 | Hansen | 40—109 |
| 2,415,581 | 2/1947 | Doub | 235—89 |
| 2,447,903 | 8/1948 | Dimit | 235—89 |
| 2,553,338 | 5/1951 | Shaw | 235—89 |
| 2,656,618 | 10/1953 | Pescatori | 235—89 |
| 3,055,117 | 9/1962 | Bernstein et al. | 35—9 |
| 3,083,906 | 4/1963 | Giuntini | 235—89 |
| 3,248,050 | 4/1966 | Dickson | 235—89 |

STEPHEN J. TOMSKY, *Primary Examiner.*

RICHARD B. WILKINSON, *Examiner.*

S. A. WAL, *Assistant Examiner.*